(12) United States Patent
Emek et al.

(10) Patent No.: US 7,412,649 B2
(45) Date of Patent: Aug. 12, 2008

(54) VIEWING AND EDITING MARKUP LANGUAGE FILES WITH COMPLEX SEMANTICS

(75) Inventors: Roy Emek, Tel Aviv-Jaffa (IL); Alex Goldin, Haifa (IL); Louis Weitzman, Brookline, MA (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 11/042,391

(22) Filed: Jan. 24, 2005

(65) Prior Publication Data

US 2006/0168562 A1   Jul. 27, 2006

(51) Int. Cl.
G06F 17/00 (2006.01)

(52) U.S. Cl. ........................ 715/530; 715/234; 715/200

(58) Field of Classification Search ......... 715/513–514, 715/500, 501.1, 530, 255, 234, 256, 200
See application file for complete search history.

(56) References Cited

U.S. PATENT DOCUMENTS

| | | | |
|---|---|---|---|
| 6,484,190 B1 * | 11/2002 | Cordes et al. ............... | 715/514 |
| 6,678,686 B1 | 1/2004 | Patel et al. | |
| 6,678,738 B2 | 1/2004 | Haverstock et al. | |
| 6,769,095 B1 | 7/2004 | Brassard et al. | |
| 6,792,595 B1 | 9/2004 | Storistenau et al. | |
| 2001/0032218 A1 | 10/2001 | Huang | |
| 2002/0026461 A1 * | 2/2002 | Kutay et al. ................. | 707/523 |
| 2002/0129060 A1 | 9/2002 | Rollins et al. | |
| 2002/0152244 A1 | 10/2002 | Dean et al. | |
| 2003/0204814 A1 | 10/2003 | Elo et al. | |
| 2003/0226111 A1 * | 12/2003 | Wirts et al. ................. | 715/514 |
| 2004/0049522 A1 | 3/2004 | Streepy | |
| 2004/0177321 A1 | 9/2004 | Brown et al. | |
| 2004/0205592 A1 * | 10/2004 | Huang ........................ | 715/513 |
| 2005/0102612 A1 * | 5/2005 | Allan et al. ................. | 715/513 |
| 2005/0132276 A1 * | 6/2005 | Panditharadhya et al. ... | 715/513 |

* cited by examiner

*Primary Examiner*—Thu Huynh

(57) ABSTRACT

The semantic hierarchy of a document written in a markup language is represented by a hierarchy of elements, which are viewed and edited using a tree view editor. Each element is represented as a node of a semantic tree, to which may be attached a special purpose editor, capable of editing the semantic properties of that particular element. Such special purpose editors handle the single element to which they are attached and may handle a hierarchy of elements that share common properties in the subtree headed by the single element. They offer a visualization of the elements to which they are attached that is not necessarily hierarchical in form.

2 Claims, 4 Drawing Sheets

VIEWING AND EDITING MARKUP LANGUAGE FILES WITH COMPLEX SEMANTICS

BACKGROUND OF THE INVENTION

1. Field of the Invention

This invention relates to computerized documents. More particularly, this invention relates to improvements in the editing of computerized documents written in a markup language.

2. Description of the Related Art

Markup languages permit creation of documents in generally simple, flexible text formats. For example, XML, a derivative of standard generalized markup language (SGML, IS0-8879), was originally designed to meet the challenges of large-scale electronic publishing. XML is also playing an increasingly important role in the exchange of a wide variety of data on the worldwide web and elsewhere. Details of XML may be found on the Internet at the web site of the World Wide Web Consortium (W3C).

Existing XML editors provide a tree view for all the elements of a XML file and, a common editor for the attributes of each element. For example, Xeena is a XML editor, which is available from Alpha Works via the URL "www.alphaworks.ibm.com". In Xeena, which is a Java® application, XML attributes of the XML elements are edited via a table. Each attribute value is entered using an editing graphical user interface (GUI) component, e.g., a combo box or text field, which is derived from the document type definition (DTD). The editor then guides the user in inserting elements into the tree. Xeena uses a tree widget to display hierarchically organized file elements, and a small table-like widget. The widgets allow a user to interface with the XML document via a graphical user interface (GUI) and to edit the attributes of a currently selected element.

Another known XML editor is XML-Spy, available from Altova Inc., 900 Cummings Center Suite, 314-T, Beverly, Mass. 01915-6181. This editor presents all the elements of a XML document, and their attributes in an extended table format.

SUMMARY OF THE INVENTION

A tree view becomes a limitation when the XML file in question reaches a certain level of complexity. Some nodes of the tree may have semantic properties that are too complex to be represented as simple XML attributes. Such nodes can themselves be represented using a hierarchy of XML elements, together with their attributes. For example, assume the properties of one of the nodes in the semantic tree include a list a variable length. The attributes supported by a XML DTD cannot adequately represent such a list.

According to a disclosed embodiment of the invention, the semantic hierarchy of a document written in a markup language is represented by a hierarchy of elements, which are viewed and edited using a tree view editor. Each element represents a node of a semantic tree to which may be attached a special purpose editor, capable of editing the semantic properties of that particular element. Such special purpose editors handle the respective single elements to which they are attached, and may handle a hierarchy of elements that share common properties in the subtree headed by the single element. They offer a visualization of the elements to which they are attached that is not necessarily hierarchical in form.

In one aspect of the invention, a hierarchy of elements pertaining to the document is partitioned into an upper and lower level. An upper layer is edited using a conventional tree-like presentation. A lower layer is edited using a set of special purpose editors. It is possible to configure the set of editors so as to assign a particular element to either one of the layers.

The invention provides a method for editing a document written in a markup language, which is carried out by defining hierarchical elements of the document, identifying a root element of a subtree of the hierarchy, associating a selected specialized viewer with the root element, and displaying at least a portion of the subtree by actuating the selected specialized viewer.

Another aspect of the method includes displaying the hierarchical elements that are above the subtree in a tree view simultaneously with the subtree.

According to one aspect of the method, the subtree is displayed using only the selected specialized viewer.

In still another aspect of the method, the selected specialized viewer is associated with a markup language tag. The markup language tag can be a XML tag.

The invention provides a method for editing a document written in a markup language, which is carried out by defining a tree of hierarchical elements of the document including a first layer of hierarchical elements, a second layer of hierarchical elements, and a boundary layer of hierarchical elements, the boundary layer being disposed between the first layer and the second layer. Each of the hierarchical elements of the boundary layer heads a subtree including a portion of the second layer of hierarchical elements. The method is further carried out by editing the first layer of hierarchical elements using a tree view editor, selecting a specialized editor for association with one of the hierarchical elements of the boundary layer, and editing the one hierarchical element of the boundary layer and the subtree thereof using the specialized editor.

The invention provides a data processing system for editing a document written in a markup language, including a memory for storing the document, a primary editor, and a plurality of specialized editors. The system further includes a display, a processor connected to the display and the memory. The processor is operative to perform the steps of defining hierarchical elements of the document, identifying a subtree of the hierarchical elements including a root element and child elements thereof, associating one of the specialized editors with the root element, and actuating the one specialized editor to output at least a portion of the subtree to the display.

According to the aspect of the data processing system, the display avoids a tree view representation of the subtree.

According to a further aspect of the data processing system, the processor is further adapted to actuate a tree view editor to output a portion of the hierarchical elements to the display, the portion including the root element of the subtree and excluding the child elements thereof.

According to a further aspect of the data processing system, the document is a XML document.

The invention provides a computer software product, including a computer-readable medium in which computer program instructions are stored, which instructions, when read by a computer, cause the computer to perform a method for editing a document written in a markup language, which is carried out by defining hierarchical elements of the document, identifying a root element of a subtree including a portion of the hierarchical elements, associating a selected specialized viewer with the root element, and displaying at least a portion of the subtree by actuating the selected specialized viewer.

The invention provides a computer software product, including a computer-readable medium in which computer program instructions are stored, which instructions, when read by a computer, cause the computer to perform a method for editing a document written in a markup language, which is carried out by a defining a tree of hierarchical elements of the document including a first layer of hierarchical elements, a second layer of hierarchical elements, and a boundary layer of hierarchical elements, the boundary layer being disposed between the first layer and the second layer. Each of the hierarchical elements of the boundary layer heads a subtree including a portion of the second layer of the hierarchical elements. The method is further carried out by editing the first layer of hierarchical elements using a tree view editor, electing a specialized editor for association with one of the hierarchical elements of the boundary layer, and editing the one hierarchical element of the boundary layer and the subtree thereof using the specialized editor.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client-server environment, such software programming code may be stored on a client or server. The software programming code may be embodied on computer-readable storage medium for use with a data processing system. This includes magnetic and optical storage devices such as disk drives, magnetic tape, compact discs (CD's), digital video discs (DVD's). The software programming code may be embodied in transmission medium with or without a carrier wave upon which the signals are modulated. For example, the transmission medium may include a communication network, such as the Internet. In addition, while the invention may be embodied in computer software, the functions necessary to implement the invention may alternatively be embodied in part or in whole using hardware components such as application-specific integrated circuits or other hardware, or some combination of hardware components and software.

Overview.

Figure 1:
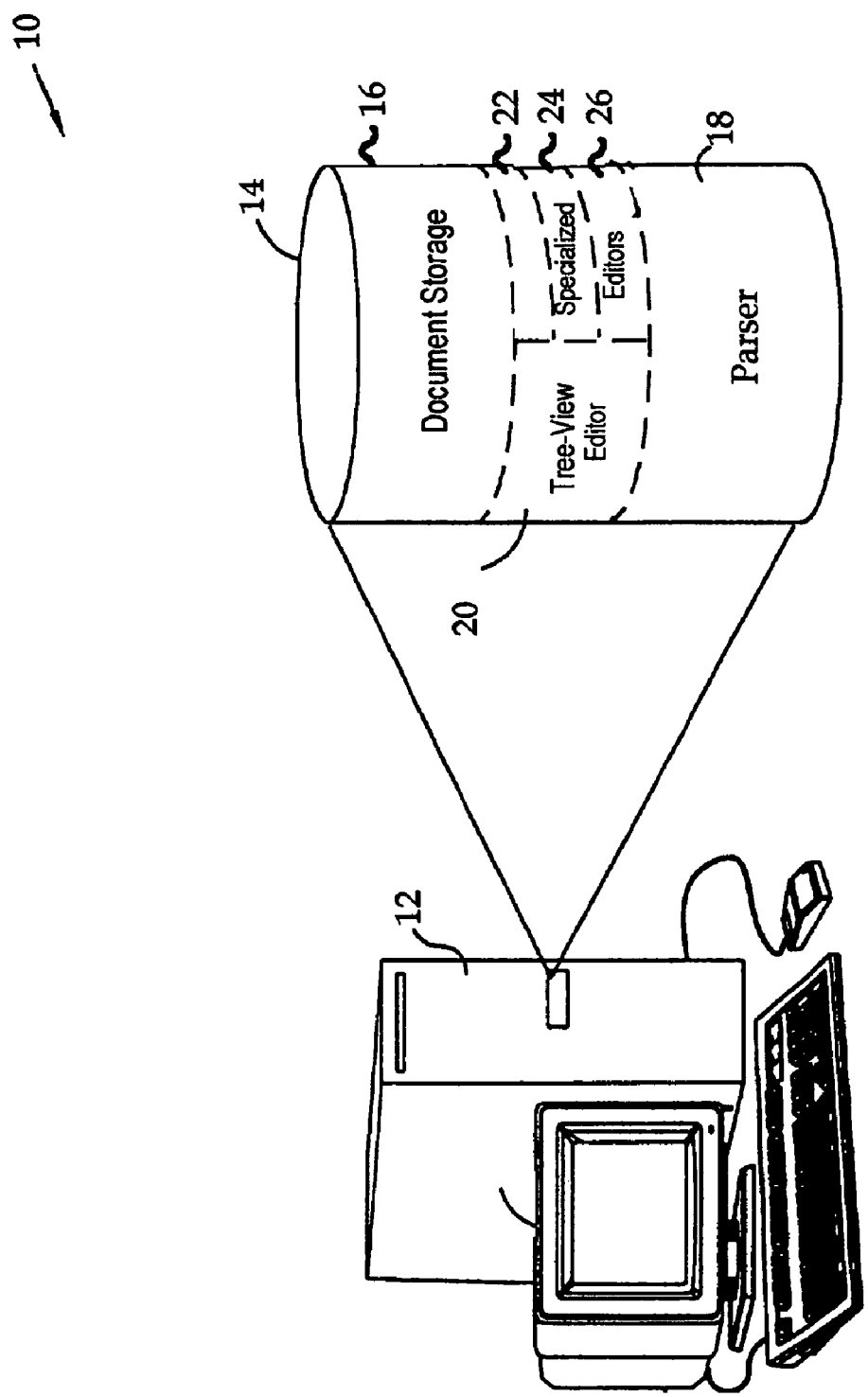
FIG. 1 is a schematic system for editing complex documents written in a markup language, which is constructed and operative in accordance with a disclosed embodiment of the invention.

Turning now to the drawings, reference is initially made to FIG. 1, which is a schematic illustration of a system 10 that is capable of edition complex documents written in a markup language, which is constructed and operative in accordance with a disclosed embodiment of the invention.

The system 10 comprises a processor 12, typically a general-purpose computer programmed with a suitable software, and a memory 14. Although the memory 14 is shown in FIG. 1 as a local data store of the computer, the memory may also be maintained at a site remote for the computer, for example, on a server or shared disk system, and accessed by the processor 12 via a network. The memory 14 has a document storage area 16, which holds files containing documents to be edited. Space is also provided for programs necessary to analyze and edit documents, including a parsing engine 18 for analyzing the grammar definition of a document, a conventional markup language editor 20, and specialized viewers or editors 22, 24, 26.

Figure 2:
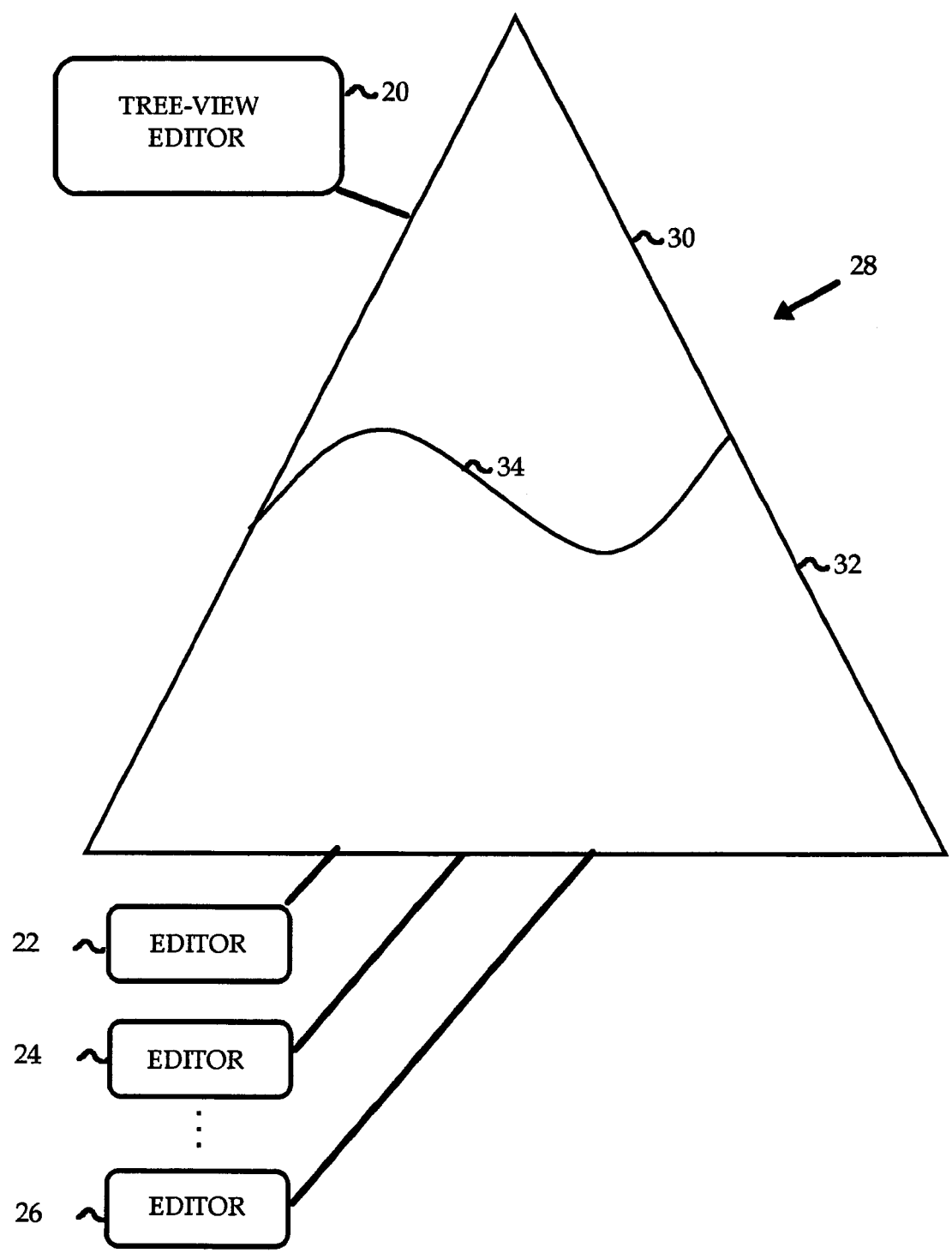
FIG. 2 is a schematic of an editing arrangement for a document written in a markup language in accordance with a disclosed embodiment of the invention.

Reference is now made to FIG. 2, which is a schematic of an editing arrangement for a document 28 written in a markup language, e.g., XML, in accordance with a disclosed embodiment of the invention. The principles of the invention are sometimes presented herein with reference to XML. However, this is exemplary, and the invention can be practiced using many markup languages by suitable modifications that can be accomplished by application of ordinary skill in the art.

In essence, a markup language file is comprised of a hierarchy of elements, each of which may head a subtree consisting of its own set of attributes and elements. The set of elements and their attributes is defined in a DTD or a schema file. The document 28 accordingly has a hierarchical grammar definition, which is divided into two separate layers: an upper layer 30 and a lower layer 32, separated by a boundary 34. The terms "upper" and "lower" are used arbitrarily herein to distinguish the two grammatical layers. These terms have no physical meanings with respect to the actual configuration of the document 28. The division of the document 28 into the layers 30, 32 is accomplished in a configurable manner, according to the particular grammatical definition of the document, i.e. according to its DTD or schema.

Figure 3:
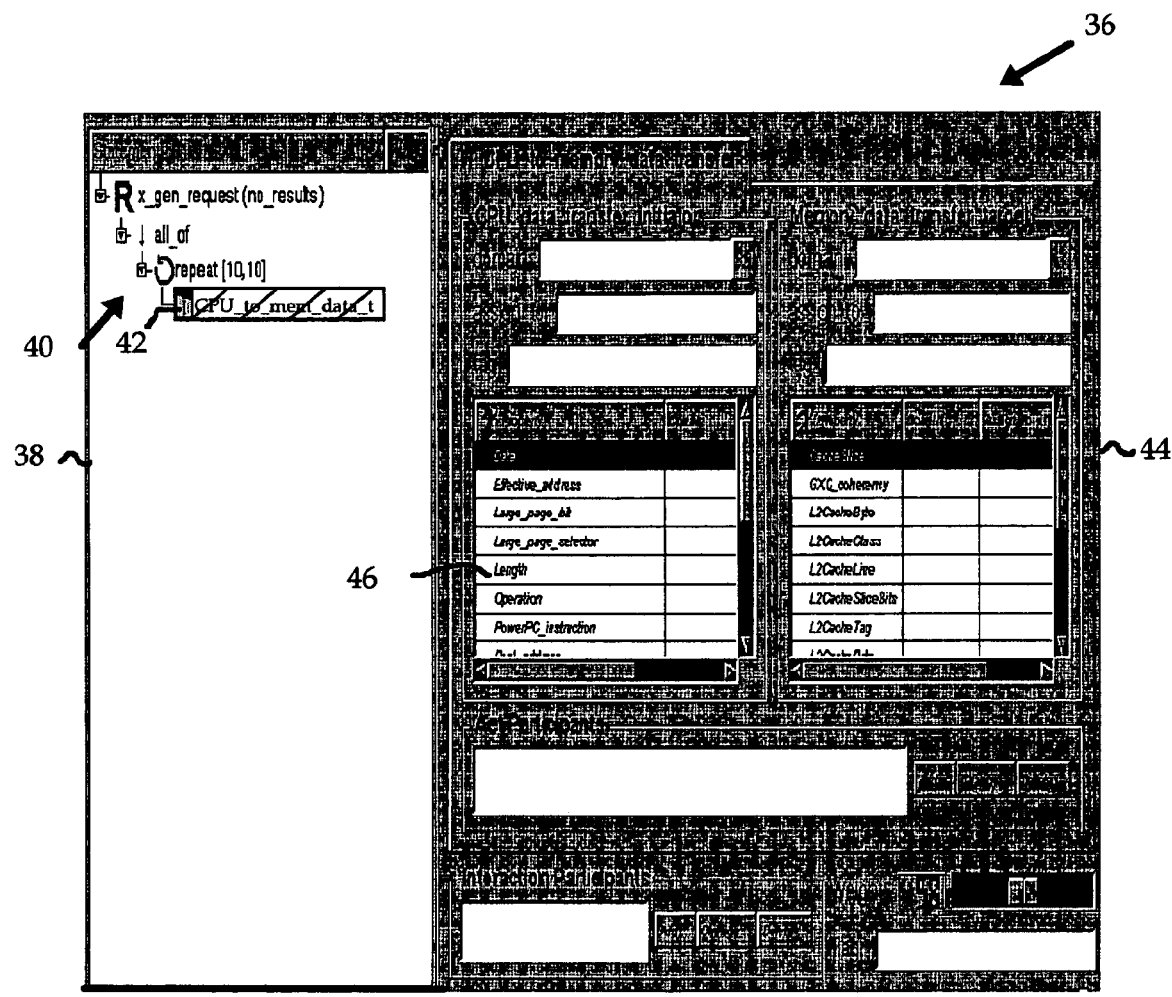
FIG. 3 is a detailed screen display of the editing arrangement shown in FIG. 2.

Reference is now made to FIG. 3, which is a display screen 36 presenting an editing arrangement for a markup language file in accordance with a disclosed embodiment of the invention. Elements of the document 28 (FIG. 2) that belong to the upper layer 30 are represented on a left plane 38 of the screen 36, organized in a tree view 40 by the editor 20. Elements that lie on the boundary 34, referred to herein as boundary elements or root elements of subtrees, as well as elements that lie above the boundary, are displayed on the left pane 38. However, the subtree that consists of the hierarchical descendants of such boundary elements is not shown in the left pane 38. Instead, when any element that lies on the boundary 34, for example an element 42, is selected by a user, one of the specialized viewers or editors 22, 24, 26 is invoked, enabling the content of the element 42 to be viewed and edited in a right pane 44, including its subtree in the hierarchy. Schema structures may include other elements and their attributes. One such structure 46 (length) is indicated representatively. While three specialized editors are shown in FIG. 1 and FIG. 3, this is merely representative. Many different specialized editors can be linked to different structures within the lower layer 32. Further details of the display of FIG. 3 are shown below in the Listing 2.

Referring again to FIG. 2, the default editor 20 for elements in the upper layer 30 can be any conventional general purpose editor, for example a XML editor.

All elements within the lower layer 32 are semantically dependant on an ancestor lying on the boundary 34 (FIG. 2), and cannot be edited outside the context of this ancestral element. The ancestor and its descendants are viewed and edited using whichever of the editors 22, 24, 26 is designated as the special purpose editor of the ancestral element. In order to provide more useful editing capabilities for structures in the lower layer 32 (FIG. 2), the specialized editors 22, 24, 26 should not be limited to the capabilities of general purpose XML editors. Rather they are adapted to present appropriate semantic contexts using a graphical user interface that is specialized for the particular type of boundary element being presented, e.g. the element 42 (FIG. 3). For example, if the element 42 headed a subtree comprising elements that represent a table, the element 42 and its descendants could be edited with a spreadsheet-like editor.

Configuration.

Continuing to refer to FIG. 2, as part of the configuration of the editor 20, special purpose editor are specified for the elements lying on the boundary 34. Any element that is above the boundary 34 is edited using the editor 20, which essentially is a tree view widget, displaying an element hierarchy, together with a table containing each element's attributes. As noted above, any element lying below the boundary has exactly one ancestor that lies on the boundary 34, and is edited using the special purpose editor assigned to that ancestor.

During configuration of the editor 20, a special purpose editor is linked to at least some of the elements defined in the DTD or the schema, for example by associating the special purpose editor or a pointer with markup language tags, e.g. XML tags. It is also possible to accomplish this by hardcoding information about the editors 22, 24, 26 in an application-specific XML editor or viewer. However, it is recommended that the configuration information be provided in an external file. This may be the DTD, schema, or even another file, such as a XML file. The last option is preferred. The use of an external file is modular, and allows the special purpose editors to be reassigned independently of the DTD or schema.

Listing 1 is a fragment of a XML file that defines a special purpose editor for an element.

LISTING 1

Listing 1

<SpecialPurposeElement name="MyElement">
    <editor class="MyElement_Editor"/>
</SpecialPurposeElement>

Operation.

Figure 4:
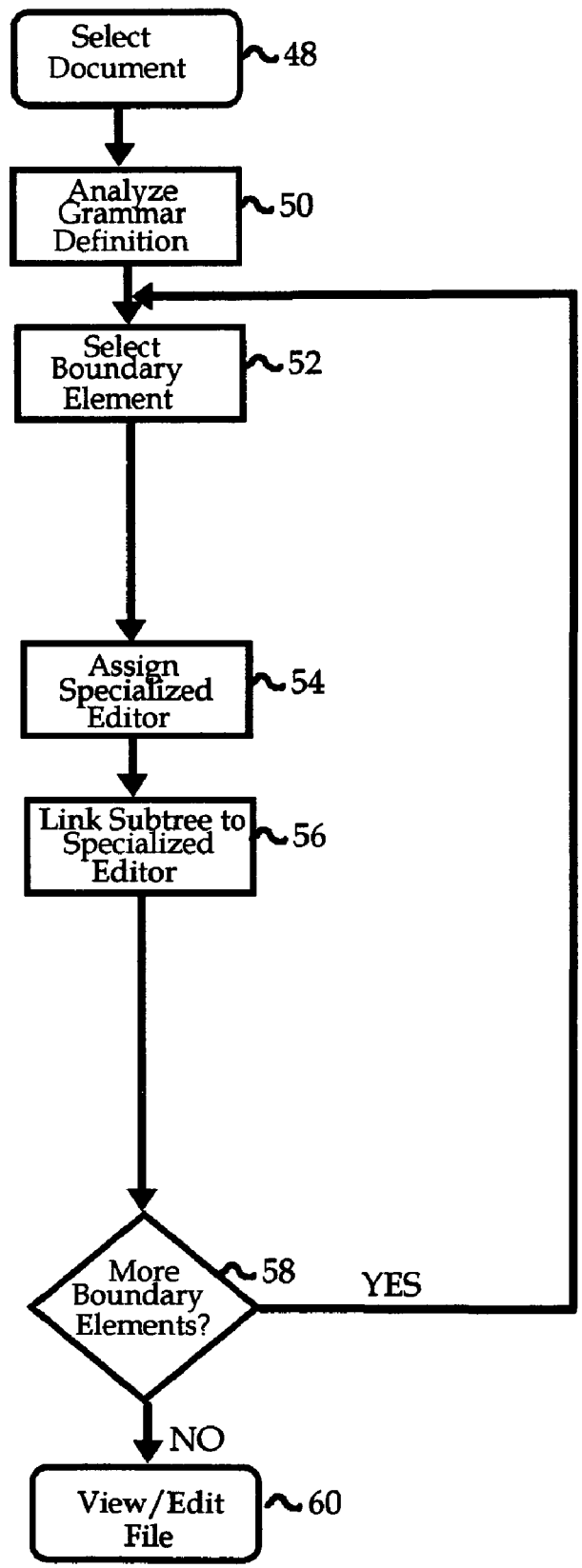
FIG. 4 is a flow chart illustrating a method of editing files written in a markup language in accordance with a disclosed embodiment of the invention.

Reference is now made to FIG. 4, which is a flow chart illustrating a method of editing files written in a markup language in accordance with a disclosed embodiment of the invention. The process steps are shown in a particular sequence in FIG. 4 for clarity of presentation. However, it will be evident that many of them can be performed in parallel, asynchronously, or in different orders.

The process begins at initial step 48. A document is selected. A primary tree view editor is chosen, and its configuration file accessed or initialized. Alternatively, the primary tree view editor may subsequently be configured as a separate process.

Next, at step 50 the grammar definition contained in a schema or DTD of the document is accessed and analyzed in order to identify upper level elements lying in the upper layer 30, boundary elements lying on the boundary 34, and lower level subtrees in the lower layer 32 headed by the boundary elements (FIG. 2). The grammar definition forms the basis for the following steps.

Next, at step 52 a boundary element is selected from the grammar definition.

Next, at step 54 a specialized editor is associated with the current boundary element that was chosen at step 52. This can be done by associating data identifying the specialized editor with a markup language tag. An appropriate indication of the assignment is made in the primary editor, such that when the boundary element is selected by the user, its respective specialized editor can be invoked.

Next, at step 56 the subtree headed by the current boundary element is made available to the specialized editor selected at step 54. This can be done in many ways. For example, the subtree could be read into a memory area of the specialized editor. Alternatively, a pointer to the subtree could be passed to the specialized editor.

Control proceeds to decision step 58, where it is determined if more boundary elements of the grammar definition remain to be processed. If the determination at decision step 58 is affirmative, then control returns to step 52.

If the determination at decision step 58 is negative, then control proceeds to final step 60. The document and others having the same grammar definition may now be loaded for viewing and editing using the primary tree view editor initially. Appropriate specialized editors can be invoked upon selection of a boundary element by the user. A boundary element and the structures of its subtree may be presented on a side-by-side simultaneous display with the upper level elements as shown in FIG. 3. Alternatively, the specialized editor may output one or more separate display screens.

Implementation Details.

C++.

Special purpose editors are implemented as C++ classes. All these classes inherit from a single base class SP_Editor. A registration mechanism is used to form the relationship between the C++ class that implements an editor, and the string given in the 'class' property of the 'editor', as shown in Listing 1. A parsing module, e.g. the parsing engine 18 (FIG. 1), or a similar module integral with the editor 20 parses the file containing the definitions of specialized editors, identifies elements that require such editors, looks up editor names in the registry, and instantiates new editors accordingly.

Java.

The Java implementation is similar to that of C++. The process of identifying an editor class could be simplified, thought, by exploiting Java's reflection feature: after the XML file that defines special purpose editors is parsed, reflection is used to identify the class that implements a given special purpose editor.

EXAMPLE 1

Listing 2 illustrates a portion of a DTD that defines the grammar of X-Gen request files. X-gen is a system-level test case generator, and it accepts request files that define templates for test cases to be generated. The screen display of FIG. 3 is a visual representation of this DTD.

LISTING 2

| Listing 2 |
|---|
| <!ELEMENT x_gen_request . . .<br>    (\|bounded_interaction\|repeat\|one_of\|all_of\| . . . )+ ><br><!ATTLIST x_gen_request<br>    random_seed NMTOKEN "0"<br>    author CDATA #IMPLIED ><br><!ELEMENT all_of<br>  . . . (\|bounded_interaction\|repeat\|one_of\|all_of\| . . . )+><br><!ATTLIST all_of<br>    generation_order ( . . . ) 'as_given'<br>    order_control ( . . . ) #IMPLIED><br><!ELEMENT bounded_interaction ( . . . , act* ) ><br><!ATTLIST bounded_interaction<br>    interaction %interaction_entity; #REQUIRED ><br><!ELEMENT act ( ( . . . )*, (participant\|actor)+ ) ><br><!ATTLIST act<br>    . . .<br>    name CDATA #REQUIRED> |

From a semantic point of view, the hierarchy of elements in Listing 2 contains nodes of the following types: x_request, bounded_interaction, repeat, one-of, all-of, and bounded-interaction. All of the XML elements that follow the element bounded interaction in Listing 2, e.g., the elements act, actor, and participant, are not nodes in the semantic tree, but rather are semantic properties of a bounded interaction.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method for editing a document written in a markup language, comprising the steps of:

defining by a computer, a tree of hierarchical elements of said document comprising a first layer of hierarchical elements, a second layer of hierarchical elements, and a boundary layer of hierarchical elements according to a document type definition (DTD) or schema of the document, said boundary layer being disposed between said first layer and said second layer, wherein said hierarchical elements in said boundary layer head respective subtrees comprising a portion of said second layer of hierarchical elements, said subtrees having child elements;

editing said first layer of hierarchical elements using a tree view editor;

associating respective specialized editors with said hierarchical elements in said boundary layer;

responsively to said associating, automatically associating said specialized editors with said child elements of said subtrees, respectively; and editing content of said hierarchical elements in said boundary layer and editing content of said-child elements of said subtrees thereof using said respective specialized editors, the specialized editors are from applications different from the application of the tree view editor.

2. A data processing system for editing a document written in a markup language, comprising:

a memory storing said document, a primary editor, and a plurality of specialized editors;

a display;

a computer processor connected to said display and said memory operative to:

automatically define a tree of hierarchical elements of said document comprising a first layer of hierarchical elements, a second layer of hierarchical elements, and a boundary layer of hierarchical elements according to a document type definition (DTD) or schema of the document, said boundary layer being disposed between said first layer and said second layer, wherein said hierarchical elements in said boundary layer head respective subtrees comprising a portion of said second layer of hierarchical elements, said subtrees having child elements;

edit said first layer of hierarchical elements using a tree view editor;

establish an association of respective said specialized editors with said hierarchical elements in said boundary layer;

responsively to said association automatically associate said specialized editors with said child elements of said subtrees, respectively; and cooperatively with said display, said computer processor presents and edits content of said hierarchical elements in said boundary layer and presents and edits content of said child elements of said subtrees thereof using said respective specialized editors, the specialized editors are from applications different from the applications of the tree view editor and primary editor.

* * * * *